United States Patent
Chen

(10) Patent No.: US 7,356,757 B2
(45) Date of Patent: Apr. 8, 2008

(54) FAULT TOLERANCE SYSTEM AND METHOD FOR ONE OR TWO FAILED DISKS IN A DISK ARRAY

(75) Inventor: Mien-Chih Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 527 days.

(21) Appl. No.: 11/025,280

(22) Filed: Dec. 29, 2004

(65) Prior Publication Data

US 2005/0283652 A1    Dec. 22, 2005

(30) Foreign Application Priority Data

Feb. 6, 2004    (TW) .............................. 93102722 A

(51) Int. Cl.
*G06F 11/00* (2006.01)

(52) U.S. Cl. ................................... 714/800
(58) Field of Classification Search ............... 714/800
See application file for complete search history.

(56) References Cited

U.S. PATENT DOCUMENTS

| | | | | |
|---|---|---|---|---|
| 5,233,618 A | | 8/1993 | Glider et al. ................. 714/6 |
| 5,271,012 A | * | 12/1993 | Blaum et al. ................. 714/6 |
| 5,594,862 A | | 1/1997 | Winkler et al. ............... 714/5 |
| 5,761,402 A | * | 6/1998 | Kaneda et al. ................ 714/6 |
| 6,158,017 A | | 12/2000 | Han et al. ..................... 714/6 |
| 6,223,323 B1 | | 4/2001 | Wescott .................... 714/770 |
| 6,353,895 B1 | | 3/2002 | Stephenson .................. 714/5 |
| 6,993,701 B2 | * | 1/2006 | Corbett et al. ............ 714/770 |
| 2005/0050384 A1 | * | 3/2005 | Horn ........................... 714/6 |
| 2006/0123268 A1 | * | 6/2006 | Forhan et al. ................ 714/6 |

OTHER PUBLICATIONS

Corbett et al., Row-diagonal parity for double disk failure correction, Mar. 2004, 3rd USENIX conference on File & Storage Technologies, Google.com (printed Jul. 2007), p. 1 to 20.*

* cited by examiner

*Primary Examiner*—Shelly A Chase
(74) *Attorney, Agent, or Firm*—Morris Manning Martin LLP; Tim Tingkang Xia, Esq.

(57) ABSTRACT

A fault tolerance system for one or two failed disks in a disk array includes a CPU, a disk array, and a bus. The disk array includes disks, each of which is logically divided into multiple blocks, wherein the blocks include data blocks, P parity blocks and Q parity blocks. The CPU, which is connected to the disk array through the bus, includes: an exclusive-or (XOR) unit for performing XOR operations on blocks of the disk array when generating P/Q parities or reconstructing failed data; a modulus operation unit for performing modulus operations; a shift operation unit for performing shift operations on the blocks of the disk array; and an address conversion unit for converting a logic address into a physical address. Related methods are also provided.

20 Claims, 11 Drawing Sheets

US 7,356,757 B2

FAULT TOLERANCE SYSTEM AND METHOD FOR ONE OR TWO FAILED DISKS IN A DISK ARRAY

BACKGROUND OF THE INVENTION

1. Field of the Invention

The present invention relates to computer fault tolerance systems and methods, and particularly to a fault tolerance system and method for one or two failed disks in a disk array.

2. Related Art of the Invention

As users have demanded increased reliability and capacity of computer storage systems, disk array storage systems have evolved as a solution to both needs. Disk array storage systems use multiple disks, and distribute the data over multiple disks. Distributing the data over multiple disks is a process commonly referred to as "striping." Striping the data over the disks enhances performance as compared to a single disk, because smaller amounts of data are written to or read from multiple disks in parallel. The total time needed to complete a particular read or write operation is therefore reduced because multiple disks perform the operation in parallel.

However, multiplying the number of disks used to store data increases the probability of a disk failure causing loss of data. Therefore storage arrays provide additional storage, which has redundancy information used to recover data lost due to failure of other disks. A Redundant Array of Independent Disks (RAID) is a storage technology commonly used in present-day disk array storage systems. There are several "levels" of RAID technology. RAID level 6 provides for recovery from a two-disk failure using an additional parity block. The first parity block (P) is calculated with XOR (exclusive-or) operations of data blocks. The second parity block (Q) is based on Reed-Solomon codes requiring finite field computations. Such finite field computations are substantially complex and may require significant computational resources. The complexity of Reed-Solomon codes may preclude their use in certain software, or may necessitate the use of expensive special purpose hardware. Thus, implementation of Reed-Solomon codes in a disk array increases the cost and complexity of the array. Unlike the simple XOR codes, Reed-Solomon codes cannot easily be distributed among dedicated XOR processors.

Accordingly, there is a need for an inexpensive and simple system and method for calculating P/Q parities and reconstructing one or two failed disks in a disk array.

SUMMARY OF THE INVENTION

An objective of the present invention is to provide a system and method for calculating P/Q parities for all data stored in a disk array, in which only simple XOR operations are employed.

Another objective of the present invention is to provide a system and method for reconstructing one failed disk in a disk array, by utilizing P or Q parities and simple XOR operations.

A further objective of the present invention is to provide a system and method for reconstructing two failed disks in a disk array, by utilizing P/Q parities and simple XOR operations.

To accomplish the above objectives, a fault tolerance system for one or two failed disks in a disk array in accordance with a preferred embodiment of the present invention comprises: a disk array, a central processing unit (CPU), and a bus. The disk array comprises a plurality of disks, each of which is logically divided into multiple blocks, wherein the blocks comprise a plurality of data blocks, P parity blocks and Q parity blocks. The CPU, which is connected to the disk array through the bus, comprises: an exclusive-or (XOR) unit for performing XOR operations on blocks of the disk array when generating P/Q parities or reconstructing failed data; a modulus operation unit for performing a modulus operation on an operand; a shift operation unit for performing shift operations on the blocks of the disk array; and an address conversion unit for converting a logic address into a physical address.

In addition, the present invention provides a method for calculating P/Q parities, the method comprising the steps of: (a1) setting i and j as "0," wherein i and j respectively represent a number of a certain disk and a block number; (a2) reading a datum $D(i,j)$ from the disk array and setting $i=i+1$; (a3) determining whether i is less than n, wherein n represents a number of disks for storing data; (a4) returning to the step (a2), if i is less than n; (a5) calculating an XOR of all data $D(i,j)$s which have the same block number j to obtain a corresponding $P(j)$, if i is not less than n; (a6) writing $P(j)$ into a corresponding P parity block; (a7) setting j j+1 to calculate another $P(j)$; (a8) determining whether j is less than n−1; and (a9) returning to the step a(2), if j is less than n−1; and (b1) setting k as "0;" (b2) reading all data (i,j)s each of whose i and j meet the relationship: $k=(i+j) \bmod n$; (b3) calculating an XOR of all the data $D(i,j)$s to obtain a corresponding $Q(k)$; (b4) writing $Q(k)$ into a corresponding Q parity block; (b5) setting $k=k+1$ to calculate another $Q(k)$; (b6) determining whether k is less than n; and (b7) returning to the step (b2), if k is less than n.

Further, the present invention provides a method for reconstructing one failed disk, the method comprising the steps of: (c1) setting a block number j as "0;" (c2) reconstructing a datum $D(i,j)$ of the failed disk utilizing a P parity $P(j)$, wherein i is a disk number of the failed disk; or (c3) reconstructing a datum $D(i,j)$ of the failed disk utilizing a Q parity $Q(k)$, wherein k is a parameter; (c4) setting $j=j+1$ to reconstruct another datum $D(i,j)$; (c5) determining whether j is less than n−1, wherein n is a number of disks for storing data blocks; and (c6) returning to the step of reconstructing a datum $D(i,j)$ of the failed disk utilizing a P parity $P(j)$ or a Q parity $Q(k)$, if j is less than n−1.

Moreover, the present invention provides a method for reconstructing two failed disks, the method comprising the steps of: (d1) setting a block number j as "0" and a parameter $y=b-a-1$, wherein 'b' and 'a' respectively represent disk numbers of the two failed disks with 'a' being less than 'b'; (d2) performing an operation $((a+y) \bmod n)$ to obtain k, wherein n is a number of disks for storing data and is any prime number greater than 4, and k is a parameter; (d3) reconstructing a datum $D(a,y)$ by utilizing a Q parity $Q(k)$; (d4) reconstructing a datum $D(b,y)$ by utilizing a P parity $P(y)$; (d5) performing another operation $((y+(b-a)) \bmod n)$ to obtain a new y, and setting $j=j+1$ to reconstruct another datum; (d6) determining whether j is less than n−1; and (d7) returning to the step of performing an operation $((a+y) \bmod n)$ to obtain k, if j is less than n−1.

Other objects, advantages and novel features of the present invention will be drawn from the following detailed description with reference to the attached drawings, in which:

DETAILED DESCRIPTION OF THE INVENTION

Figure 1:
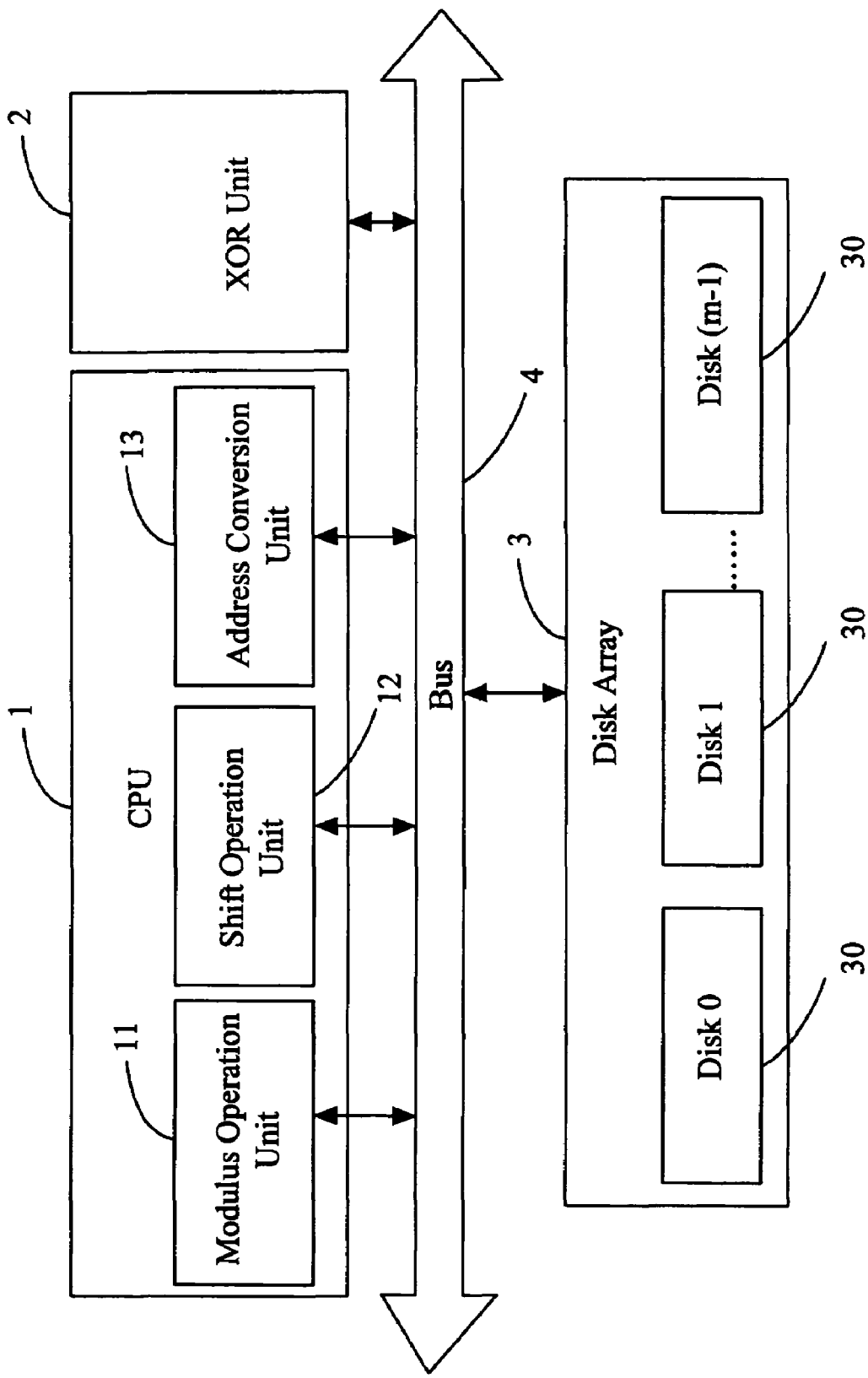
FIG. 1 is a block diagram of hardware infrastructure of a fault tolerance system for one or two failed disks in a disk array in accordance with a preferred embodiment of the present invention.

FIG. 1 is a block diagram of hardware infrastructure of a fault tolerance system in a disk array (hereinafter, "the system") in accordance with the preferred embodiment of the present invention. The system comprises a processor being a central processing unit (CPU) 1, an exclusive-or (XOR) unit 2, a disk array 3, and a bus 4. The CPU 1 comprises a modulus operation unit 11 for performing a modulus operation on an operand, a shift operation unit 12 for performing shift operations on blocks of the disk array 3, and an address conversion unit 13 for converting a logic address into a physical address. The XOR unit 2 is separate from the CPU 1, and performs an XOR operation (denoted hereinafter by the symbol "⊕") on blocks of the disk array 3. The disk array 3 comprises m disks 30 (symbolically depicted as disk 0, disk 1, ..., disk (m-l)), each of which is divided into a plurality of blocks. There are two additional new disks 30 (not shown) in the disk array 3 for storing recovered data of one or two failed disks. The bus 4 connects the CPU 1 and the XOR unit 2 to the disk array 3.

Figure 2:
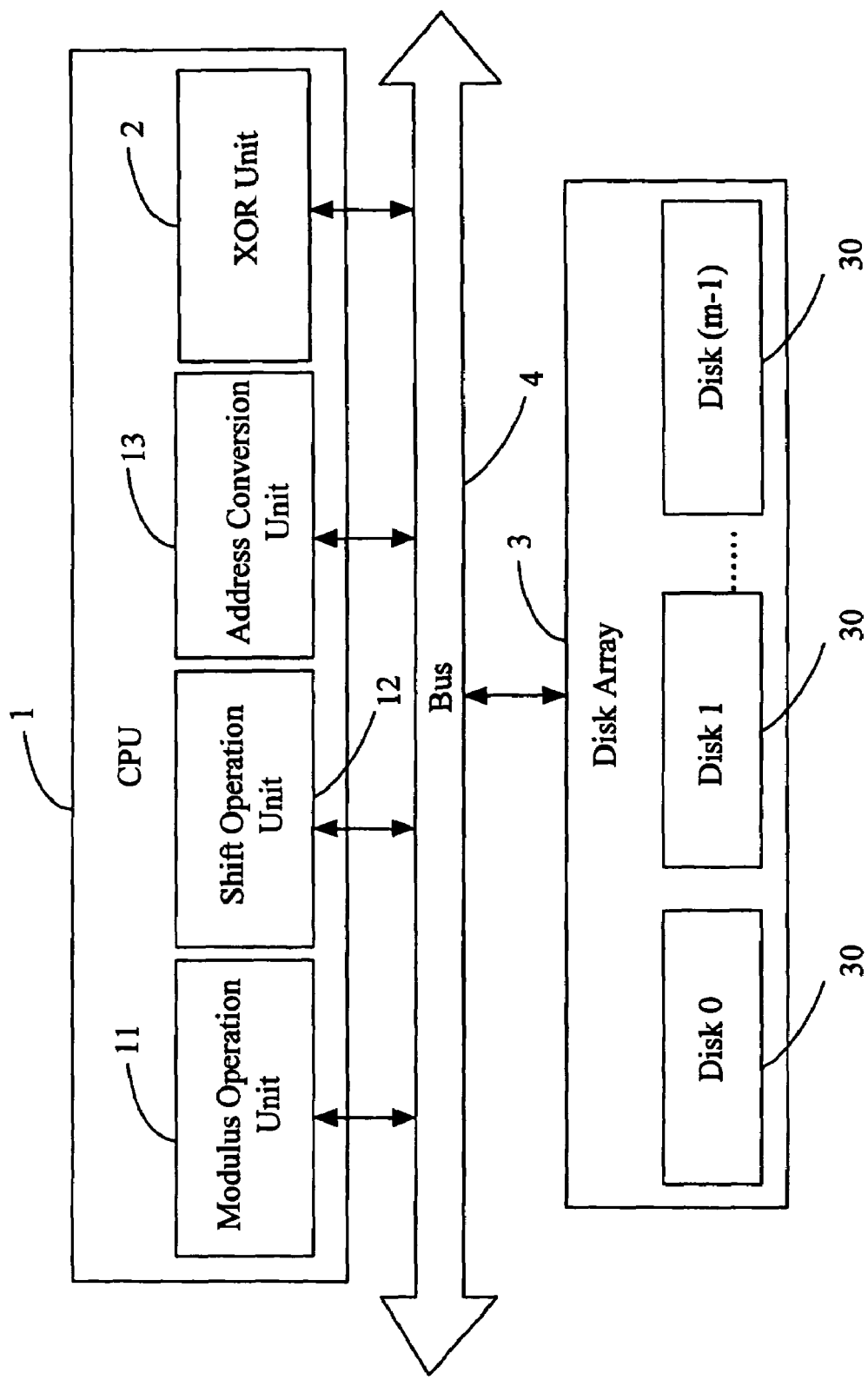
FIG. 2 is a block diagram of hardware infrastructure of a fault tolerance system for one or two failed disks in a disk array in accordance with an alternative embodiment of the present invention.

FIG. 2 is a block diagram of hardware infrastructure of a fault tolerance system in accordance with an alternative embodiment of the present invention. The system of the alternative embodiment is the same as that of the preferred embodiment, except that the XOR unit 2 is included in the CPU 1.

Figure 3:
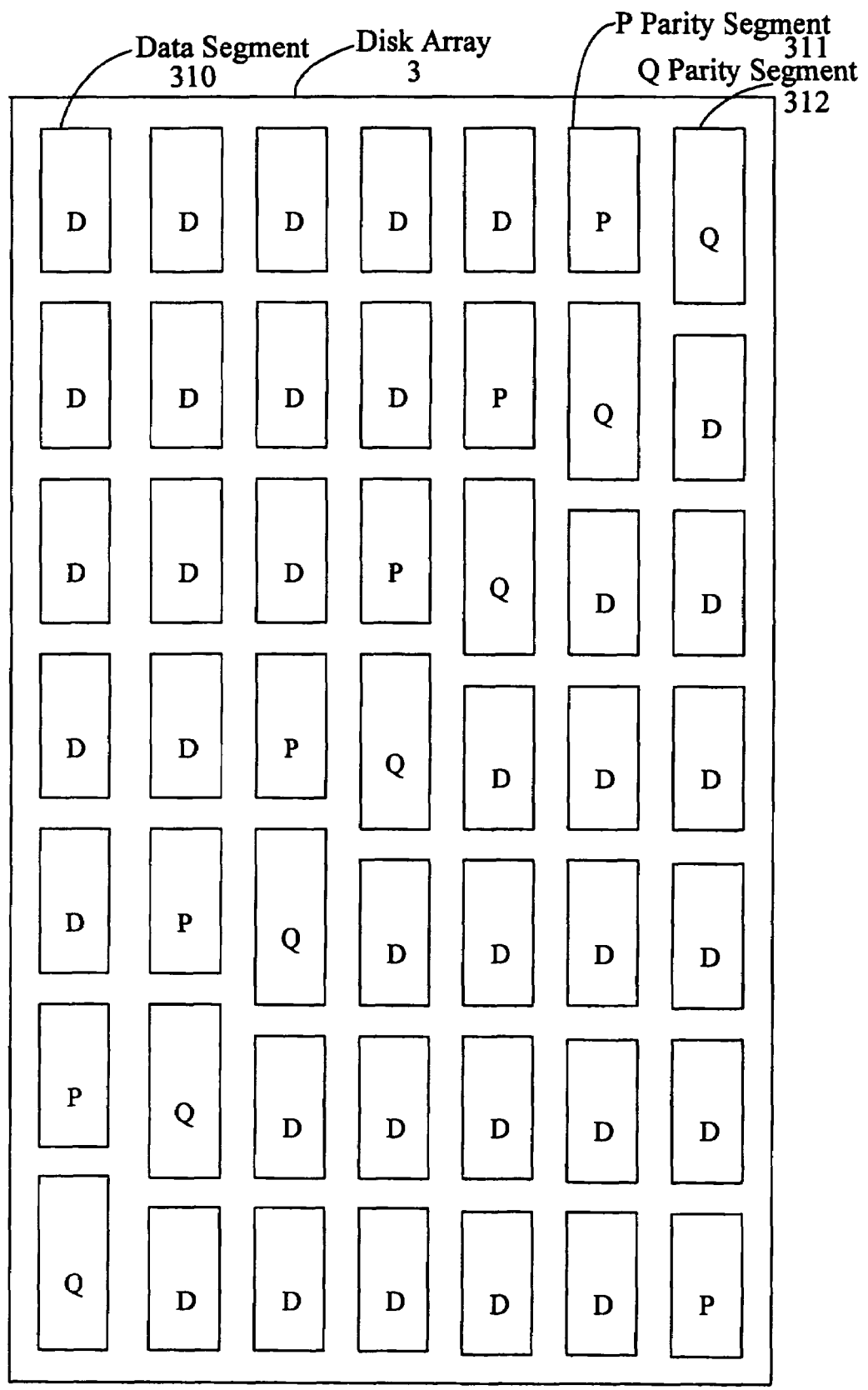
FIG. 3 is a schematic diagram showing an initial arrangement of data segments, P parity segments and Q parity segments of a disk array, and arrangements of these segments after successive shift operations have been performed.

FIG. 3 is a schematic diagram showing an initial arrangement of data segments, P parity segments and Q parity segments of a disk array 3, and arrangements of these segments after successive shift operations have been performed. In the preferred embodiment of the present invention, the disk array 3 contains n disks 30 to store data segments 310, and contains another two independent disks 30 to store P parity segments 311 and Q parity segments 312 respectively. That means, m=n+2. In practice, n is any prime number greater than 4. For convenience, in the preferred embodiment, n is 5. Nevertheless, the description should not be construed as limiting the invention to any n being particular prime number. Accordingly, the disk array 3 is composed of 7 disks 30, as shown in the first row in FIG. 3. The shift operation unit 12 can perform one or more left shift operations on the data segments 310, the P parity segments 311 and the Q parity segments 312 according to particular requirements. The other rows in FIG. 3 show arrangements of the shift operation results.

Figure 4:
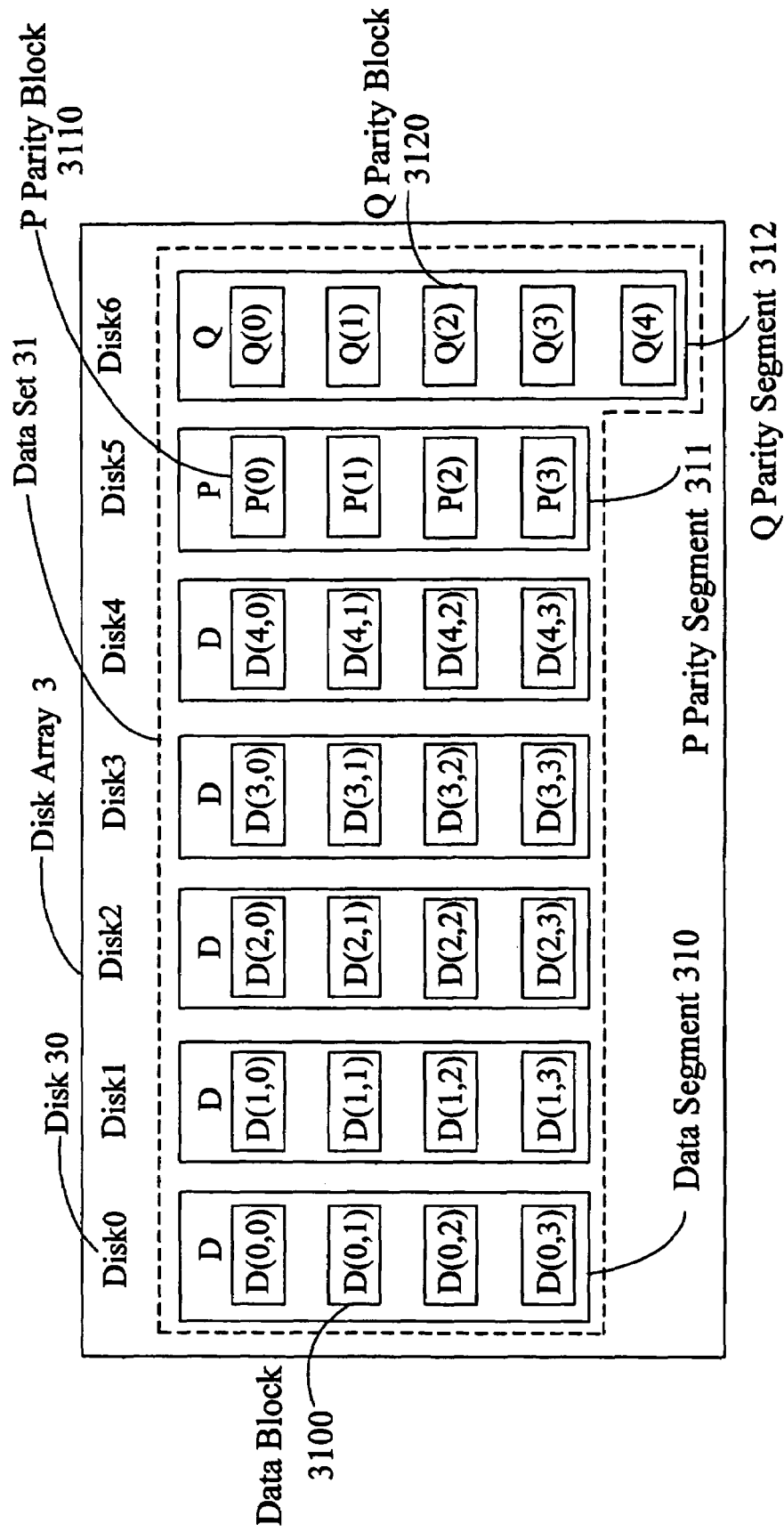
FIG. 4 is a schematic diagram showing data blocks of data segments and P/Q parity blocks of P/Q parity segments contained in a data set in a disk array.

FIG. 4 is a schematic diagram showing data blocks of the data segments 310 and P/Q parity blocks of the P/Q parity segments 311/312 contained in a data set in the disk array 3. In the preferred embodiment, the disk array 3 distributes data to multiple disks 30, and employs data sets 31 (only one labeled) to represent a group of related blocks. The disk array 3 contains 7 disks 30 symbolically depicted as disk 0, disk 1, ..., and disk 6, each of which is divided into multiple blocks having the same size. Disks 0, 1, 2, 3, and 4 are for storing the data segments 310, and disks 5 and 6 are for storing the P parity segments 311 and the Q parity segments 312 respectively. Each data segment 310 and the P parity segment 311 contain a same number, represented by the symbol of "x", of blocks. The Q parity segment 312 contains one more block than the P parity segment 311, i.e., "x+1" blocks. In the preferred embodiment, it is assumed that each data segment 310 includes 4 data blocks 3100, and the P parity segment 311 includes 4 P parity blocks 3110. Thus, the Q parity segment 312 includes 5 Q parity blocks 3120. Each data block 3100 is for storing a datum (symbolically depicted as $D(i,j)$). Each P parity block 3110 and Q parity block 3120 is respectively for storing P parity (symbolically depicted as $P(j)$) and Q parity (symbolically depicted as $Q(k)$). In this nomenclature, i represents a number of a corresponding disk 30, and j and k respectively represent a block number.

$P(j)$, the value of a P parity block 3110 in the data set 31, is computed by an XOR operation of all of the data $D(i,j)$s, each of which has the same block number j as $P(j)$. Likewise, $Q(k)$, the value of a Q parity block 3120 in the data set 31, is computed by an XOR operation of all of the data $D(i,j)$s, wherein k, i and j are related as follows: $k=((i+j) \bmod n)$.

According to the calculation rules described above, the following formulas are obtained. Each formula describes how to calculate a $P(j)/Q(k)$ by using corresponding data $D(i,j)$s:

$$P(0)=D(0,0) \oplus D(1,0) \oplus D(2,0) \oplus D(3,0) \oplus D(4,0),$$

$$P(1)=D(0,1) \oplus D(1,1) \oplus D(2,1) \oplus D(3,1) \oplus D(4,1),$$

$$P(2)=D(0,2) \oplus D(1,2) \oplus D(2,2) \oplus D(3,2) \oplus D(4,2),$$

$$P(3)=D(0,3) \oplus D(1,3) \oplus D(2,3) \oplus D(3,3) \oplus D(4,3),$$

$$Q(0)=D(0,0) \oplus D(4,1) \oplus D(3,2) \oplus D(2,3),$$

$$Q(1)=D(1,0) \oplus D(0,1) \oplus D(4,2) \oplus D(3,3),$$

$$Q(2)=D(2,0) \oplus D(1,1) \oplus D(0,2) \oplus D(4,3),$$

$$Q(3)=D(3,0) \oplus D(2,1) \oplus D(1,2) \oplus D(0,3),$$

$$Q(4)=D(4,0) \oplus D(3,1) \oplus D(2,2) \oplus D(1,3).$$

Figure 5:
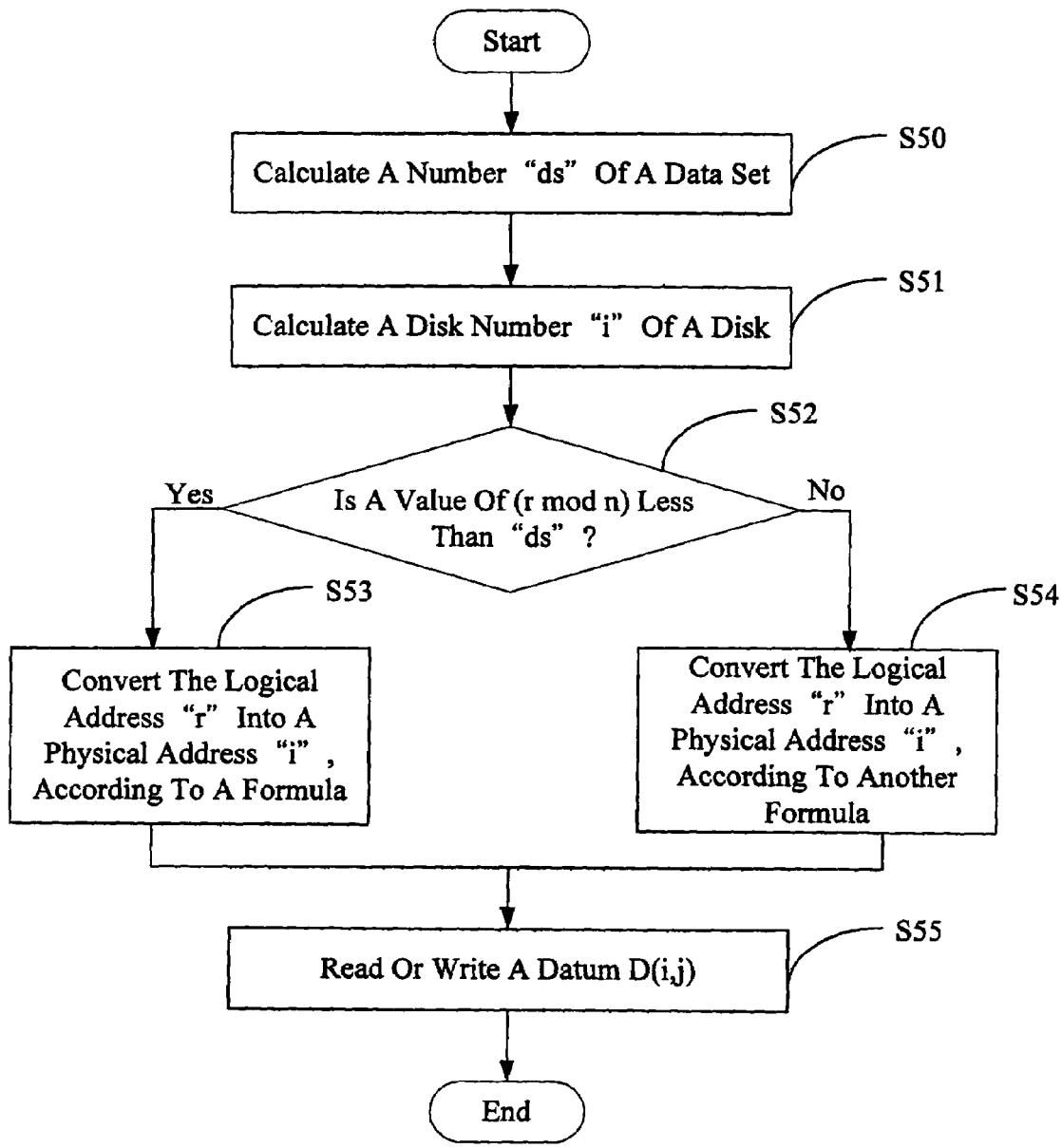
FIG. 5 is a flowchart of a preferred method for reading/writing a datum after converting a logic address into a physical address, in accordance with the present invention.

FIG. 5 is a flowchart of a preferred method for reading/writing a datum $D(i,j)$ after converting a logic address into a physical address, which is performed by utilizing the system. In step S50, the modulus operation unit 11 calculates a number "ds" of a data set 31 according to the formula: ds=(r/(n*(n−1))) mod (n=2), wherein r is a logic address of a data block 3100, and n is a number of disks 30 for storing data blocks 3100. In step S51, the modulus operation unit 11 calculates a number "i" of a disk 30 according to another formula: i=((r mod n) +(n+2 −ds)) mod (n+2). In step S52, the modulus operation unit 11 determines whether a value of(r mod n) is less than ds. If the value of (r mod n) is less than ds, in step S53, the address conversion unit 13 converts the logic address r into a physical address "j" of the data block 3100, according to the formula: j=r/n+r/n*(n−1)*(n+2)+1. Thereupon the procedure goes to step S55 described below. In contrast, if the value of(r mod n) is not less than ds, in step S54, the address conversion unit 13 converts the logic address r into a physical address "j" of the data block 3100, according to another formula: j=r/n+r/n*(n−1)*(n+2). Thereupon the procedure goes to step S55. In step S55, the CPU 1 reads a datum D(i,j) from the data block 3100 of a corresponding disk 30, or writes a datum D(i,j) into a data block 3100 of a corresponding disk 30.

Figure 6:
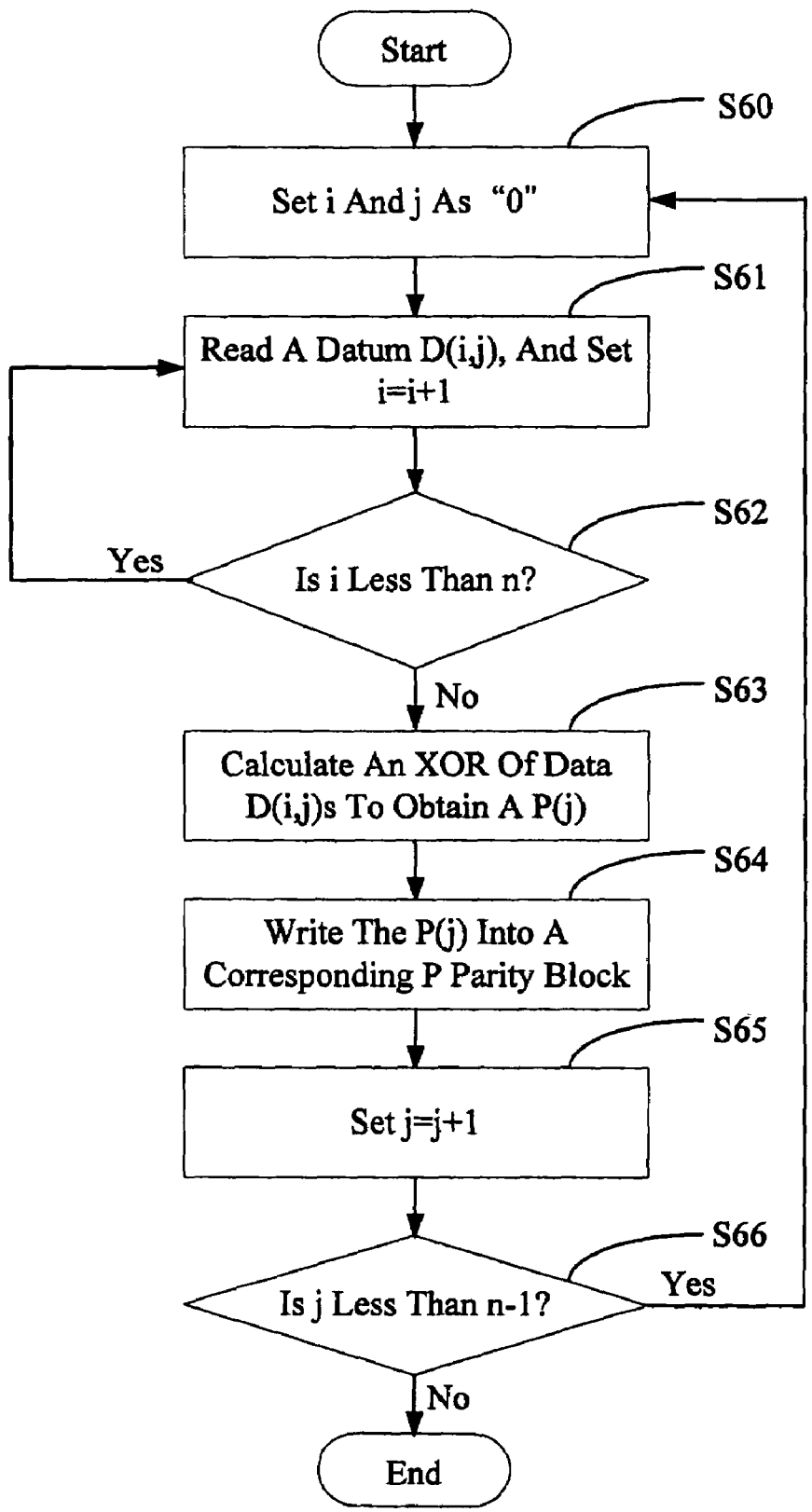
FIG. 6 is a flowchart of a preferred method for calculating P parities in accordance with the present invention.

FIG. 6 is a flowchart of a preferred method for calculating P parities, which is performed by utilizing the system. In step S60, the CPU 1 respectively sets i and j as "0." In step S61, the CPU 1 reads a datum D(i,j) from the disk array 3 utilizing the method of FIG. 5, and sets i=i+1. In step S62, the CPU 1 determines whether i is less than n. If i is less than n, the procedure returns to step S61 described above. In contrast, if i is not less than n, in step S63, the CPU 1 calculates an XOR of all the data D(i,j)s which have the same block number j to obtain a corresponding P(j). In step S64, the CPU 1 writes the P(j) into a corresponding P parity block 3110. In step S65, the CPU 1 sets j=j+1 to calculate another P(j). In step S66, the CPU 1 determines whether j is less than n−1. If j is less than n−1, the procedure returns to step S61. In contrast, if j is not less than n−1, the procedure is finished.

Figure 7:
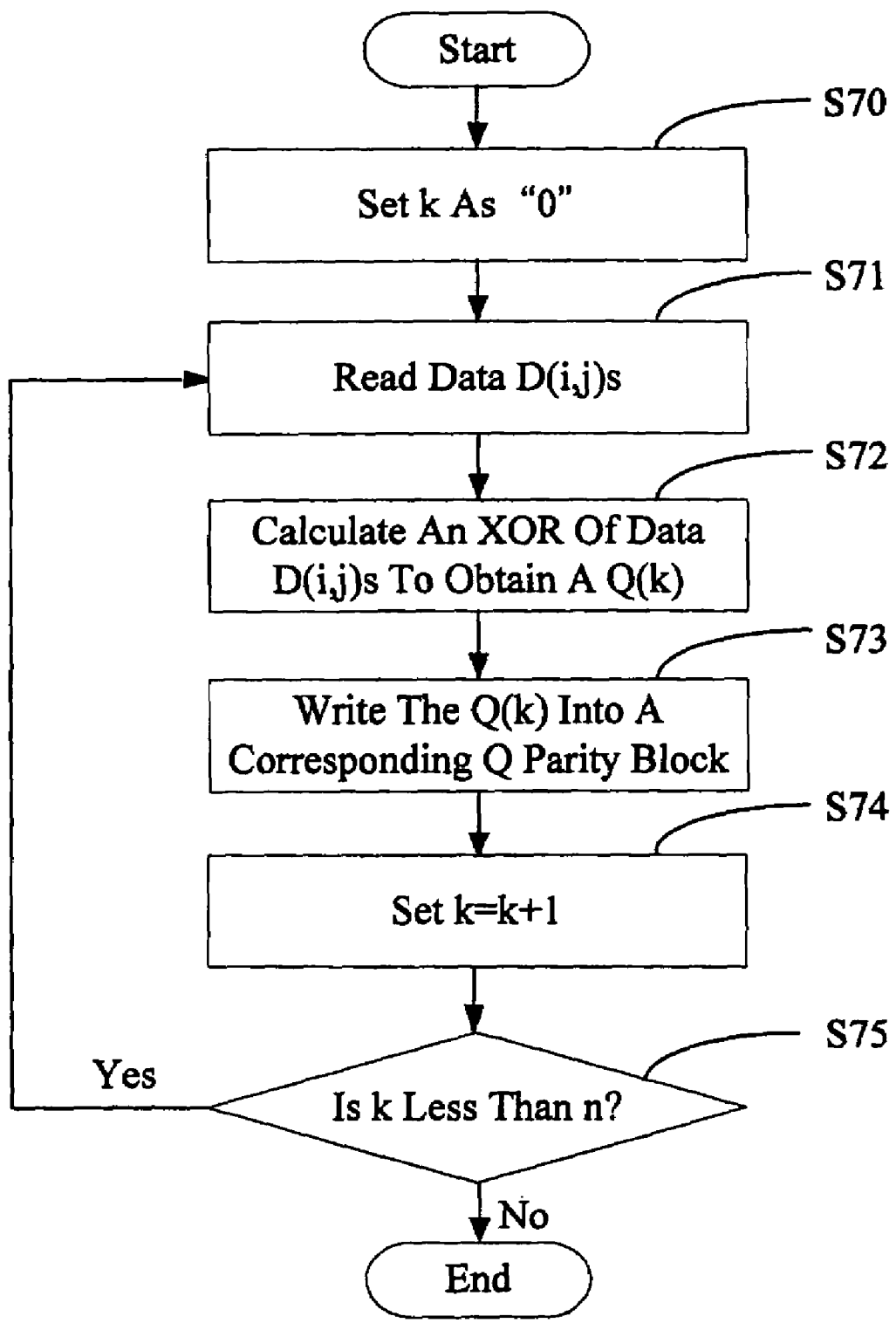
FIG. 7 is a flowchart of a preferred method for calculating Q parities in accordance with the present invention.

FIG. 7 is a flowchart of a preferred method for calculating Q parities, which is performed by utilizing the system. In step S70, the CPU 1 sets k as "0." In step S71, the CPU 1 reads all data D(i,j)s each of whose i and j meet the relationship: k=((i+j) mod n), by utilizing the method of FIG. 5. In step S72, the CPU 1 calculates an XOR of all the data D(i,j)s to obtain a corresponding Q(k). In step S73, the CPU 1 writes the Q(k) into a corresponding Q parity block 3120. In step S74, the CPU 1 sets k=k+1 to calculate another Q(k). In step S75, the CPU 1 determines whether k is less than n. If k is less than n, the procedure returns to step S71. In contrast, if k is not less than n, the procedure is finished.

Figure 8:
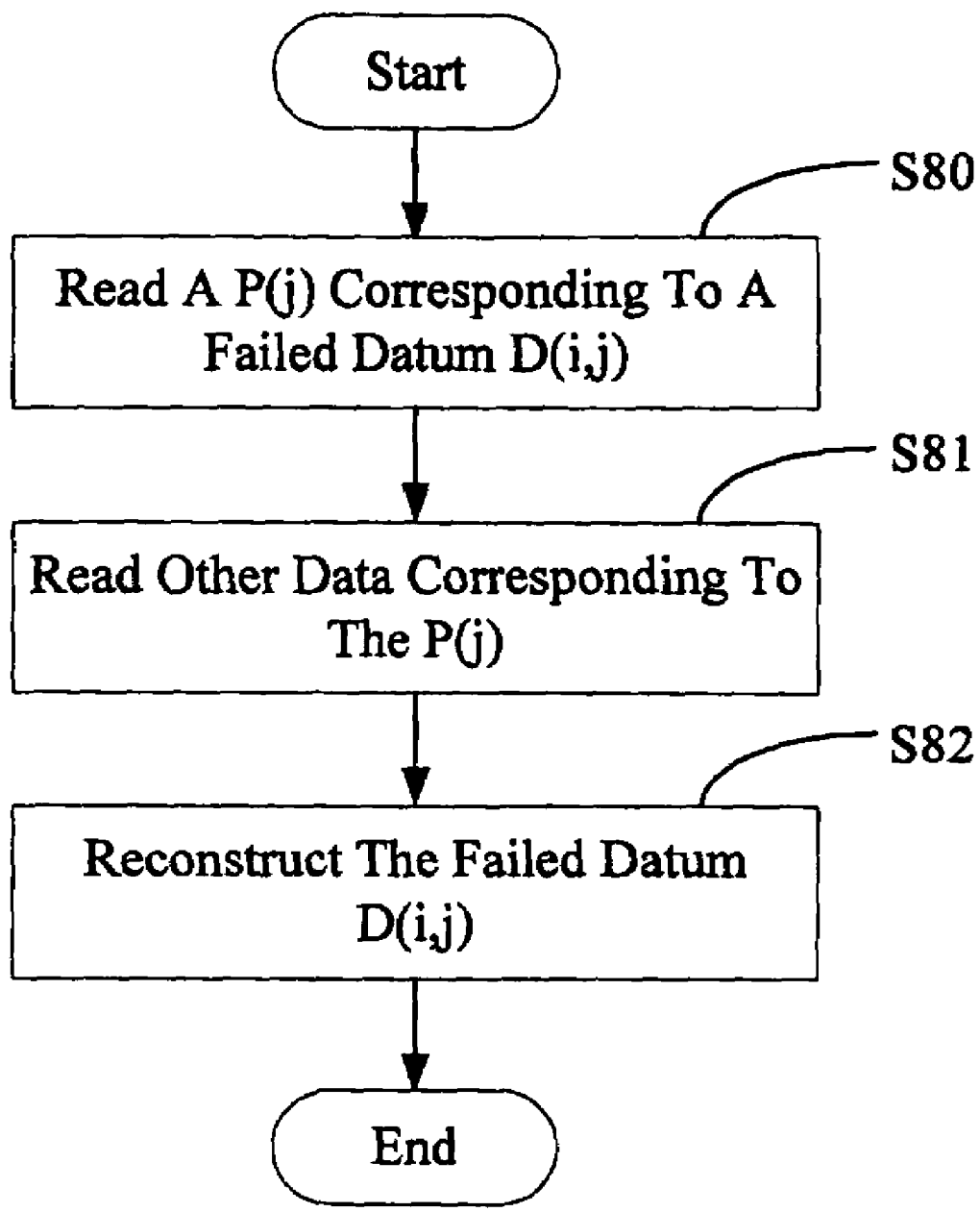
FIG. 8 is a flowchart of a preferred method for reconstructing a failed datum utilizing a P parity, in accordance with the present invention.

FIG. 8 is a flowchart of a preferred method for reconstructing a failed datum D(i,j) using a P parity P(j), which is performed by utilizing the system. In step S80, the CPU 1 reads a P(j) which corresponds to the failed datum D(i,j). That is, the P(j) has the same block number j as the failed datum D(i,j). In step S81, the CPU 1 reads other data which corresponds to the P(j) (that is, other data have the same block number j as the P(j)), by utilizing the method of FIG. 5. In step S82, the CPU 1 reconstructs the failed datum D(i,j). That is, the CPU 1 calculates the failed datum D(i,j) by an XOR of the P(j) and other corresponding data.

Figure 9:
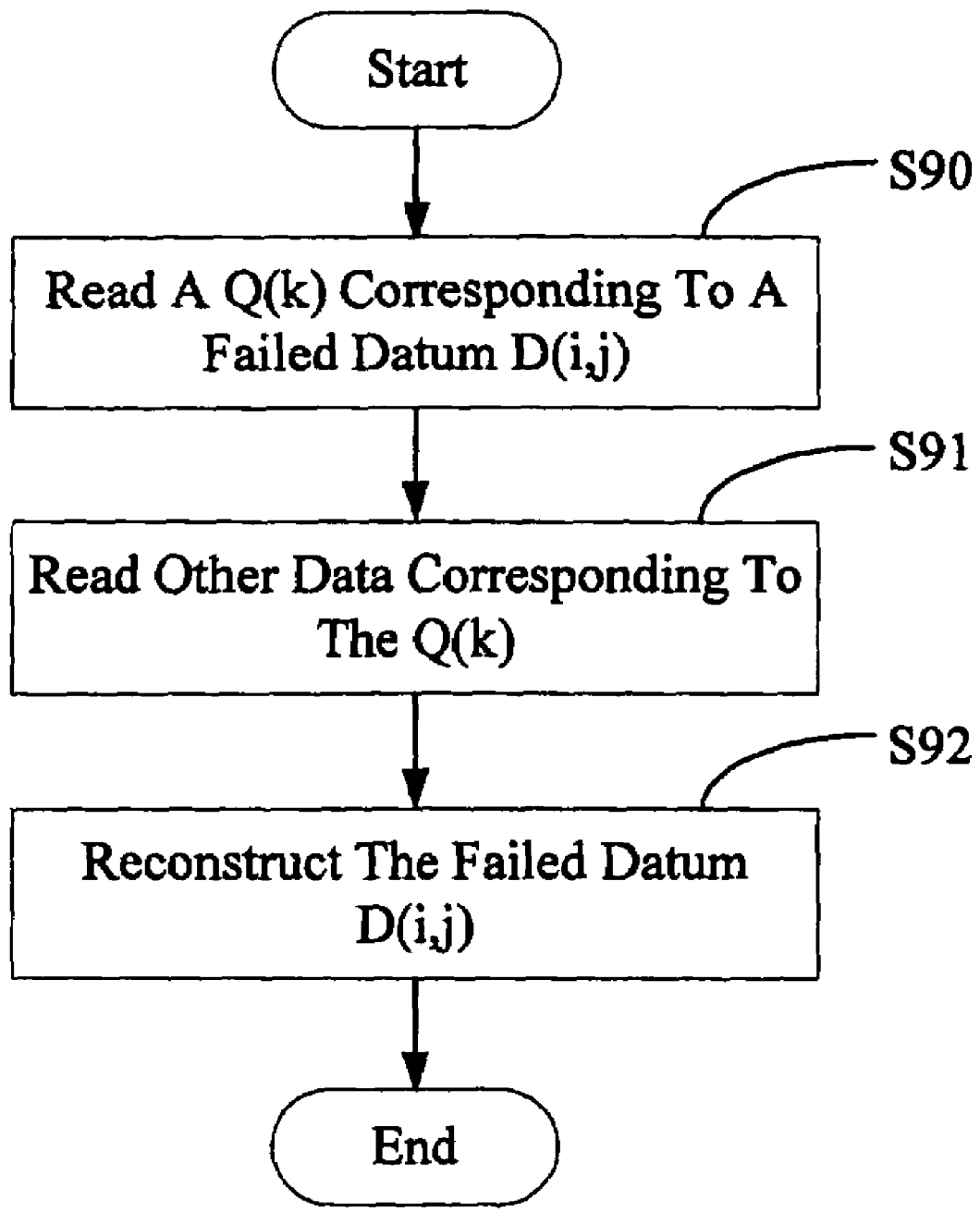
FIG. 9 is a flowchart of a preferred method for reconstructing a failed datum utilizing a Q parity, in accordance with the present invention.

FIG. 9 is a flowchart of a preferred method for reconstructing a failed datum D(i,j) using a Q parity Q(k), which is performed by utilizing the system. In step S90, the CPU 1 reads a Q(k) which corresponds to the failed datum D(i,j); that is, where k, i and j meet the relationship: k=((i+j) mod n). In step S91, the CPU 1 reads other data corresponding to the Q(k), by utilizing the method of FIG. 5. In step S92, the CPU 1 reconstructs the failed datum D(i,j). That is, the CPU 1 calculates the failed datum D(i,j) by an XOR of the Q(k) and other corresponding data.

Figure 10:
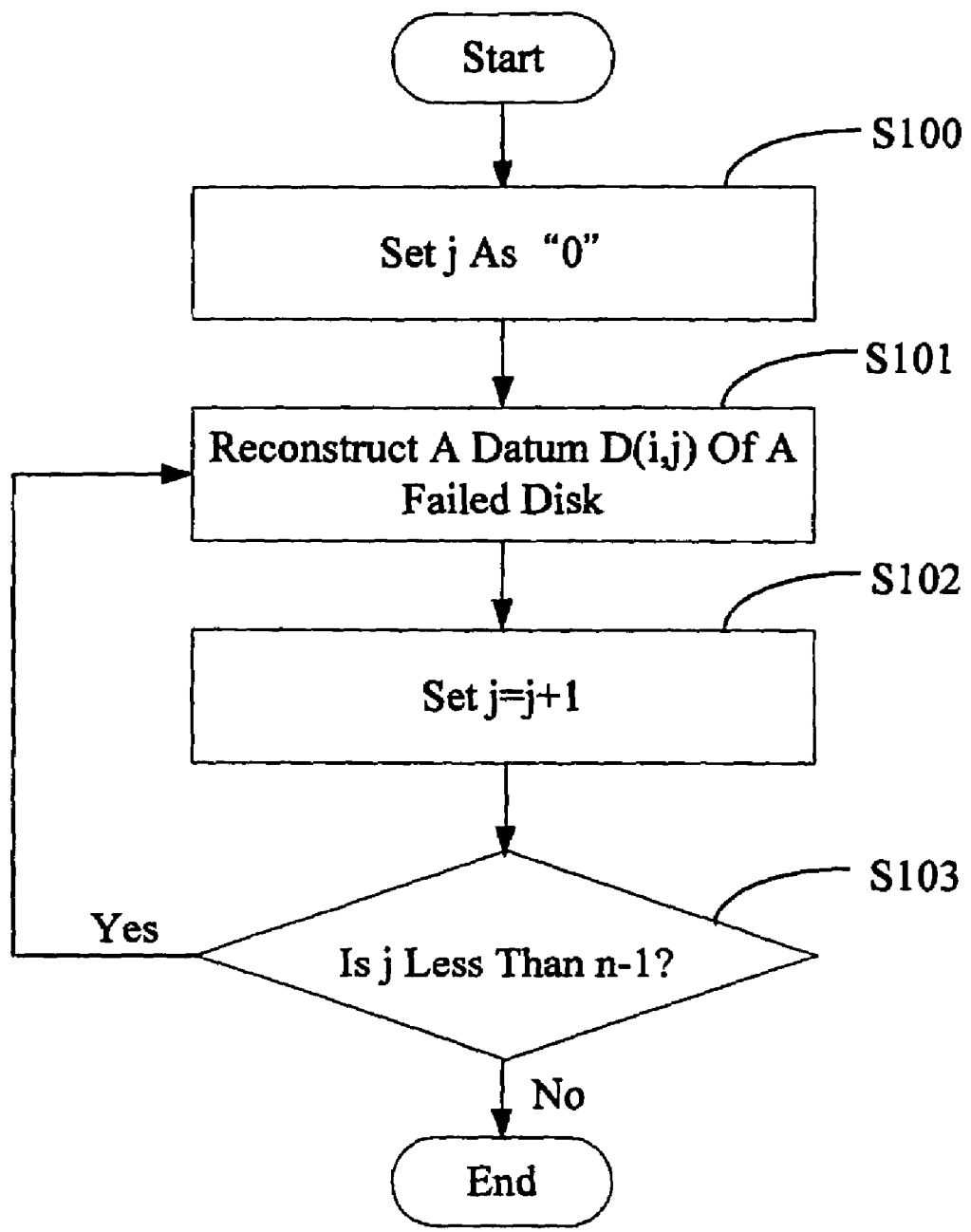
FIG. 10 is a flowchart of a preferred method for reconstructing a single failed disk in accordance with the present invention.

FIG. 10 is a flowchart of a preferred method for reconstructing a single failed disk 30, which is performed by utilizing the system. Generally, when a single disk fails, the data lost on that single disk is reconstructed by performing an XOR of the relevant data and corresponding P or Q parity on an additional new disk. In step S100, the CPU 1 sets j as "0." In step S101, the CPU 1 reconstructs a datum D(i,j) of the single failed disk 30 by utilizing either of the methods of FIGS. 8 and 9. In step S102, the CPU 1 sets j=j+1 to reconstruct another datum D(i,j). In step S103, the CPU 1 determines whether j is less than n−1. If j is less than n−1, the procedure returns to step S101. In contrast, if j is not less than n−1, the procedure is finished, because all data D(i,j)s of the single failed disk 30 have been reconstructed.

Figure 11:
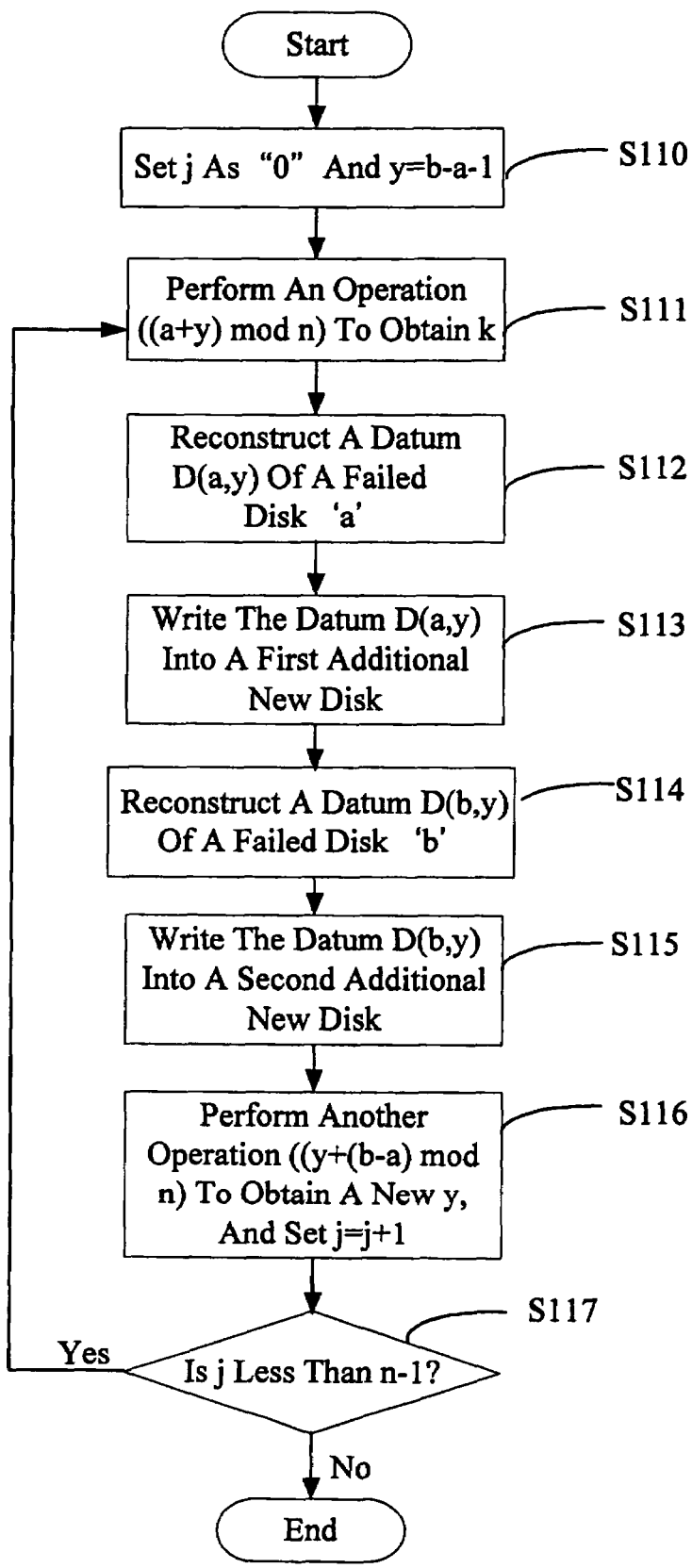
FIG. 11 is a flowchart of a preferred method for reconstructing two failed disks in accordance with the present invention.

FIG. 11 is a flowchart of a preferred method for reconstructing two failed disks 30, which is performed by utilizing the system. In step S110, the CPU 1 sets j as "0" and y=b−a−1. In this formula, 'a' and 'b' respectively represent the disk numbers of the two failed disks 30, with 'a' being less than 'b.' Further, 'y' is a parameter designated to represent a block number of a data block or a P parity block. In step S111, the CPU 1 performs the operation ((a+y) mod n) to obtain 'k.' The obtained 'k' is also a parameter, designated to represent a block number of a Q parity block. In step S112, the CPU 1 reconstructs a datum D(a,y) of the failed disk 'a' by utilizing the method of FIG. 9 and a corresponding Q(k). In step S113, the CPU 1 writes the reconstructed datum D(a,y) into a first additional new disk, in order to replace the failed disk 'a.' In step S114, the CPU 1 reconstructs a datum D(b,y) of the failed disk 'b' by utilizing the method of FIG. 8 and a corresponding P(y). In step S115, the CPU 1 writes the reconstructed datum D(b,y) into a second additional new disk, in order to replace the failed disk 'b.' In step S116, the CPU performs another operation ((y+(b−a)) mod n) to obtain a new 'y,' and sets j=j+1 to reconstruct another datum. In step S117, the CPU 1 determines whether j is less than n−1. If j is less than n−1, the procedure returns to step S111. In contrast, if j is not less than n−1, the procedure is finished, because all data of the two failed disks 30 have been reconstructed.

According to the above-described reconstruction procedures, an example of reconstructing two failed disks 30 by utilizing the system and the method of FIG. 11 is shown and described below. Table 1 represents a system of 7 disks, with each disk represented by a column of the table. Disk 0 through disk 4 each contain 4 data blocks, disk 5 contains 4 P parity blocks, and disk 6 contains 5 Q parity blocks.

TABLE 1

| Disk0 | Disk1 | Disk2 | Disk3 | Disk4 | Disk5 | Disk6 |
|-------|-------|-------|-------|-------|-------|-------|
| D(0,0) | D(1,0) | D(2,0) | D(3,0) | D(4,0) | P(0) | Q(0) |
| D(0,1) | D(1,1) | D(2,1) | D(3,1) | D(4,1) | P(1) | Q(1) |
| D(0,2) | D(1,2) | D(2,2) | D(3,2) | D(4,2) | P(2) | Q(2) |
| D(0,3) | D(1,3) | D(2,3) | D(3,3) | D(4,3) | P(3) | Q(3) |
|  |  |  |  |  |  | Q(4) |

Wherein:
P(0) = D(0,0) ⊕ D(1,0) ⊕ D(2,0) ⊕ D(3,0) ⊕ D(4,0),
P(1) = D(0,1) ⊕ D(1,1) ⊕ D(2,1) ⊕ D(3,1) ⊕ D(4,1),
P(2) = D(0,2) ⊕ D(1,2) ⊕ D(2,2) ⊕ D(3,2) ⊕ D(4,2),
P(3) = D(0,3) ⊕ D(1,3) ⊕ D(2,3) ⊕ D(3,3) ⊕ D(4,3),
Q(0) = D(0,0) ⊕ D(4,1) ⊕ D(3,2) ⊕ D(2,3),
Q(1) = D(1,0) ⊕ D(0,1) ⊕ D(4,2) ⊕ D(3,3),
Q(2) = D(2,0) ⊕ D(1,1) ⊕ D(0,2) ⊕ D(4,3),
Q(3) = D(3,0) ⊕ D(2,1) ⊕ D(1,2) ⊕ D(0,3),
Q(4) = D(4,0) ⊕ D(3,1) ⊕ D(2,2) ⊕ D(1,3).

In table 2, it is assumed that disk 0 and disk 3 fail, so that disk 0 and disk 3 are each missing all their data. Disk 0 and disk 3 cannot be reconstructed utilizing the method of FIG. 8 immediately, due to each P(j) missing two corresponding data.

TABLE 2

|  | Disk0 | Disk1 | Disk2 | Disk3 | Disk4 | Disk5 | Disk6 |
|---|---|---|---|---|---|---|---|
|  | X | D(1,0) | D(2,0) | X | D(4,0) | P(0) | Q(0) |
|  | X | D(1,1) | D(2,1) | X | D(4,1) | P(1) | Q(1) |
|  | X | D(1,2) | D(2,2) | X | D(4,2) | P(2) | Q(2) |
|  | X | D(1,3) | D(2,3) | X | D(4,3) | P(3) | Q(3) |
|  |  |  |  |  |  |  | Q(4) |

However, it can be seen that Q(2) is missing only one datum D(0,2). Therefore the missing datum D(0,2) can be reconstructed by utilizing the method of FIG. 9. Upon completion of this reconstruction, the disks are in a state as shown in Table 3.

TABLE 3

|  | Disk0 | Disk1 | Disk2 | Disk3 | Disk4 | Disk5 | Disk6 |
|---|---|---|---|---|---|---|---|
|  | X | D(1,0) | D(2,0) | X | D(4,0) | P(0) | Q(0) |
|  | X | D(1,1) | D(2,1) | X | D(4,1) | P(1) | Q(1) |
|  | D(0,2) | D(1,2) | D(2,2) | X | D(4,2) | P(2) | Q(2) |
|  | X | D(1,3) | D(2,3) | X | D(4,3) | P(3) | Q(3) |
|  |  |  |  |  |  |  | Q(4) |

Now, there is enough information to reconstruct the missing datum D(3,2) by utilizing the method of FIG. 8. Upon completion of this reconstruction, the disks are in a state as shown in Table 4.

TABLE 4

|  | Disk0 | Disk1 | Disk2 | Disk3 | Disk4 | Disk5 | Disk6 |
|---|---|---|---|---|---|---|---|
|  | X | D(1,0) | D(2,0) | X | D(4,0) | P(0) | Q(0) |
|  | X | D(1,1) | D(2,1) | X | D(4,1) | P(1) | Q(1) |
|  | D(0,2) | D(1,2) | D(2,2) | D(3,2) | D(4,2) | P(2) | Q(2) |
|  | X | D(1,3) | D(2,3) | X | D(4,3) | P(3) | Q(3) |
|  |  |  |  |  |  |  | Q(4) |

It can be seen that Q(0) is missing only one datum D(0,0), giving the result of Table 4. Therefore the missing datum D(0,0) can be reconstructed by utilizing the method of FIG. 9. Upon completion of this reconstruction, the disks are in a state as shown in Table 5.

TABLE 5

|  | Disk0 | Disk1 | Disk2 | Disk3 | Disk4 | Disk5 | Disk6 |
|---|---|---|---|---|---|---|---|
|  | D(0,0) | D(1,0) | D(2,0) | X | D(4,0) | P(0) | Q(0) |
|  | X | D(1,1) | D(2,1) | X | D(4,1) | P(1) | Q(1) |
|  | D(0,2) | D(1,2) | D(2,2) | D(3,2) | D(4,2) | P(2) | Q(2) |
|  | X | D(1,3) | D(2,3) | X | D(4,3) | P(3) | Q(3) |
|  |  |  |  |  |  |  | Q(4) |

Now, there is enough information to reconstruct the missing datum D(3,0) by utilizing the method of FIG. 8. Upon completion of this reconstruction, the disks are in a state as shown in Table 6.

TABLE 6

|  | Disk0 | Disk1 | Disk2 | Disk3 | Disk4 | Disk5 | Disk6 |
|---|---|---|---|---|---|---|---|
|  | D(0,0) | D(1,0) | D(2,0) | D(3,0) | D(4,0) | P(0) | Q(0) |
|  | X | D(1,1) | D(2,1) | X | D(4,1) | P(1) | Q(1) |
|  | D(0,2) | D(1,2) | D(2,2) | D(3,2) | D(4,2) | P(2) | Q(2) |
|  | X | D(1,3) | D(2,3) | X | D(4,3) | P(3) | Q(3) |
|  |  |  |  |  |  |  | Q(4) |

It can be seen that Q(3) is missing only one datum D(0,3), giving the result of Table 6. Therefore the missing datum D(0,3) can be reconstructed by utilizing the method of FIG. 9. Upon completion of this reconstruction, the disks are in a state as shown in Table 7.

TABLE 7

|  | Disk0 | Disk1 | Disk2 | Disk3 | Disk4 | Disk5 | Disk6 |
|---|---|---|---|---|---|---|---|
|  | D(0,0) | D(1,0) | D(2,0) | D(3,0) | D(4,0) | P(0) | Q(0) |
|  | X | D(1,1) | D(2,1) | X | D(4,1) | P(1) | Q(1) |
|  | D(0,2) | D(1,2) | D(2,2) | D(3,2) | D(4,2) | P(2) | Q(2) |
|  | D(0,3) | D(1,3) | D(2,3) | X | D(4,3) | P(3) | Q(3) |
|  |  |  |  |  |  |  | Q(4) |

Now, there is enough information to reconstruct the missing datum D(3,3) by utilizing the method of FIG. 8. Upon completion of this reconstruction, the disks are in a state as shown in Table 8.

TABLE 8

|  | Disk0 | Disk1 | Disk2 | Disk3 | Disk4 | Disk5 | Disk6 |
|---|---|---|---|---|---|---|---|
|  | D(0,0) | D(1,0) | D(2,0) | D(3,0) | D(4,0) | P(0) | Q(0) |
|  | X | D(1,1) | D(2,1) | X | D(4,1) | P(1) | Q(1) |
|  | D(0,2) | D(1,2) | D(2,2) | D(3,2) | D(4,2) | P(2) | Q(2) |
|  | D(0,3) | D(1,3) | D(2,3) | D(3,3) | D(4,3) | P(3) | Q(3) |
|  |  |  |  |  |  |  | Q(4) |

It can be seen that Q(1) is missing only one datum D(0,1), giving the result of Table 8. Therefore the missing datum D(0,1) can be reconstructed by utilizing the method of FIG. 9. Upon completion of this reconstruction, the disks are in a state as shown in Table 9.

TABLE 9

|  | Disk0 | Disk1 | Disk2 | Disk3 | Disk4 | Disk5 | Disk6 |
|---|---|---|---|---|---|---|---|
|  | D(0,0) | D(1,0) | D(2,0) | D(3,0) | D(4,0) | P(0) | Q(0) |
|  | D(0,1) | D(1,1) | D(2,1) | X | D(4,1) | P(1) | Q(1) |
|  | D(0,2) | D(1,2) | D(2,2) | D(3,2) | D(4,2) | P(2) | Q(2) |
|  | D(0,3) | D(1,3) | D(2,3) | D(3,3) | D(4,3) | P(3) | Q(3) |
|  |  |  |  |  |  |  | Q(4) |

Finally, there is enough information to reconstruct the missing datum D(3,1) by utilizing the method of FIG. 8. Upon completion of this reconstruction, the disks are in a state as shown in Table 10. That is, all the data of the two failed disks 0 and 3 have been reconstructed.

TABLE 10

|  | Disk0 | Disk1 | Disk2 | Disk3 | Disk4 | Disk5 | Disk6 |
|---|---|---|---|---|---|---|---|
|  | D(0,0) | D(1,0) | D(2,0) | D(3,0) | D(4,0) | P(0) | Q(0) |
|  | D(0,1) | D(1,1) | D(2,1) | D(3,1) | D(4,1) | P(1) | Q(1) |

TABLE 10-continued

| | Disk0 | Disk1 | Disk2 | Disk3 | Disk4 | Disk5 | Disk6 |
|---|---|---|---|---|---|---|---|
| | D(0,2) | D(1,2) | D(2,2) | D(3,2) | D(4,2) | P(2) | Q(2) |
| | D(0,3) | D(1,3) | D(2,3) | D(3,3) | D(4,3) | P(3) | Q(3) |
| | | | | | | | Q(4) |

Although the present invention has been specifically described on the basis of a preferred embodiment and preferred methods, the invention is not to be construed as being limited thereto. Various changes or modifications may be made to the embodiment and methods without departing from the scope and spirit of the invention.

What is claimed is:

1. A fault tolerance system for one or two failed disks in a disk array, comprising:
    a disk array comprising n disks, each of which is logically divided into multiple blocks, wherein each of the blocks comprises a plurality of data blocks, x first parity blocks, and x+1 second parity blocks;
    a processor, which is connected to the disk array through a bus, and which comprises:
    a modulus operation unit for performing a modulus operation on an operand;
    a shift operation unit for performing shift operation on the blocks of the disk array; and
    an address conversion unit for converting a logic address into a physical address; and
    an exclusive-or (XOR) unit for performing XOR operations on blocks of the disk array when generating the first/second parity blocks, or reconstructing failed data blocks;
    wherein the processor is configured for reading selective data blocks from n−2 disks, computing the x first parity blocks according to the selective data blocks by means of a first computing rule and the x+1 second parity blocks according to the selective data blocks by means of a second computing rule, assigning the first parity blocks into one of the n disks and the second parity blocks into another one of the n disks, and reconstructing the failed data blocks in at most two disks in case of failure of the at most two disks according to the first parity blocks and the second parity blocks.

2. The system according to claim 1, wherein the data blocks are stored in n−2 disks of the disk array.

3. The system according to claim 2, wherein n is a prime number greater than 4.

4. The system according to claim 3, wherein the first parity blocks and the second parity blocks are respectively stored in two independent disks of the disk array.

5. The system according to claim 4, wherein each of the data blocks is for storing a datum, which can be symbolically depicted as D(i,j).

6. The system according to claim 5, wherein the the first/second parity blocks are for respectively storing P parities and Q parities, which can be symbolically depicted as P parities P(j) and Q parities Q(k) respectively.

7. The system according to claim 6, wherein P(j) is computed as an XOR of all of the data D(i,j) each of which has the same block number j.

8. The system according to claim 6, wherein Q(k) is computed as an XOR of all of the data D(i,j)s each of whose i and j meet the relationship: k=(i+j) mod n, and i is a disk number of a disk.

9. A computer-enabled method for calculating P/Q parities of P parity blocks and Q parity blocks of a data set in a disk array, the method comprising:
    (a1) setting i and j as "0", wherein i and j respectively represent a disk number of a disk and a block number of a data block in the data set;
    (a2) reading a datum D(i,j) from the disk array and setting i=i+1;
    (a3) determining whether i is less than n, wherein n is a number of disks for storing data D(i,j)s and is any prime number greater than 4;
    (a4) returning to step (a2), if i is less than n;
    (a5) calculating an XOR of all data D(i,j)s which have the same block number j to obtain a corresponding P parity P(j), if i is not less than n;
    (a6) writing P(j) into a corresponding P parity block;
    (a7) setting j=j+1 to calculate another P(j);
    (a8) determining whether j is less than n−1; and
    (a9) returning to step a(2), if j is less than n−1; and
    (b1) setting k as "0," wherein k is a parameter designated to represent a block number of a Q parity block;
    (b2) reading all data (i,j)s each of whose i and j meet the relationship: k=(i+j) mod n;
    (b3) calculating an XOR of all the data D(i,j)s to obtain a corresponding Q parity Q(k);
    (b4) writing Q(k) into a corresponding Q parity block;
    (b5) setting k=k+1 to calculate another Q(k);
    (b6) determining whether k is less than n; and
    (b7) returning to step (b2), if k is less than n.

10. The method according to claim 9, wherein either or both of steps (a2) and (b2) further comprises:
    calculating a data set number "ds" according to the formula: ds=(r/(n*(n−1))) mod (n+2), wherein r is a logic address of a data block;
    calculating a disk number "i" according to another formula: i=((r mod n)+(n+2−ds)) mod (n+2);
    determining whether a value of (r mod n) is less than ds; and
    converting the logic address r into a corresponding physical address "j" of the data block, according to the formula: j=r/n+r/n*(n−1)*(n+2)+1, if(r mod n) is less than ds; or
    converting the logic address r into a corresponding physical address "j" of the data block, according to another formula: j=r/n+r/n*(n−1)*(n+2).

11. A fault tolerance method for one failed disk in a disk array, the method utilizing P or Q parities of P parity blocks or Q parity blocks of a data set in the disk array, the method comprising:
    setting a block number j as "0";
    reconstructing a datum D(i,j) of the failed disk utilizing a P parity P(j), wherein i is a disk number of the failed disk; or
    reconstructing a datum D(i,j) of the failed disk utilizing a Q parity Q(k), wherein k is a parameter designated to represent a block number of a Q parity block;
    setting j=j+1 to reconstruct another datum D(i,j);
    determining whether j is less than n−1, wherein n is number of disks for storing data blocks and is any prime number greater than 4; and
    returning to the step of reconstructing a datum D(i,j) of the failed disk utilizing a P parity P(j) or to the step of reconstructing a datum D(i,j) of the failed disk utilizing a Q parity Q(k), if j is less than n−1.

12. The method according to claim 11, wherein the step of reconstructing a datum D(i,j) of the failed disk utilizing a P parity P(j) further comprises the steps of:

reading the P(j) which corresponds to the failed datum D(i,j);
reading other data corresponding to the P(j); and
calculating the failed datum D(i,j) by an XOR of the P(j) and other corresponding data.

13. The method according to claim 11, wherein the step of reconstructing a datum D(i,j) of the failed disk utilizing a Q parity Q(k) further comprises the steps of:
reading the Q(k) which corresponds to the failed datum D(i,j);
reading other data corresponding to the Q(k); and
calculating the failed datum D(i,j) by an XOR of the Q(k) and other corresponding data.

14. The method according to claim 11, wherein i, j and k meet the relationship: k=((i+j) mod n).

15. A fault tolerance method for two failed disks in a disk array utilizing P/Q parities of P parity blocks or Q parity blocks of a data set in the disk array, the method comprising:
setting a block number j as "0" and a parameter y=b−a−1, wherein 'b' and 'a' respectively represent disk numbers of the two failed disks, and 'a' is less than 'b';
performing the operation ((a+y) mod n) to obtain k, wherein n is a number of disks for storing data and is any prime number greater than 4, and k is a parameter designated to represent a block number of a Q parity block;
reconstructing a datum D(a,y) of the failed disk 'a' utilizing a Q parity Q(k);
reconstructing a datum D(b,y) of the failed disk 'b' utilizing a P parity P(y);
performing another operation ((y+(b−a)) mod n) to obtain a new y, and setting j=j+1 to reconstruct another datum;
determining whether j is less than n−1; and
returning to the step of performing the operation ((a+y) mod n) to obtain k, if j is less than n−1.

16. The method according to claim 15, wherein the step of reconstructing a datum D(a,y) of the failed disk 'a' utilizing a Q parity Q(k) further comprises the steps of:
reading the Q(k) which corresponds to the failed datum D(a,y);
reading other data corresponding to the Q(k); and
calculating the failed datum D(a,y) by an XOR of the Q(k) and other corresponding data.

17. The method according to claim 15, wherein the step of reconstructing a datum D(b,y) of the failed disk 'b' utilizing a P parity P(y) further comprises the steps of:
reading a P(y) which corresponds to the failed datum D(b,y);
reading other data corresponding to the P(y); and
calculating the failed datum D(b,y) by an XOR of the P(y) and other corresponding data.

18. A method for tolerating failure of at most two storage disks in a disk array of n storage disks, comprising:
assigning n−2 data segments from operable data into n−2 selective storage disks respectively;
computing a first parity segment having x first parity blocks according to said n−2 data segments by means of a first computing rule;
assigning said first parity segment into a selective one of said n storage disks;
computing a second parity segment having x+1 second parity blocks according to said n−2 data segments by means of a second computing rule;
assigning said second parity segment into another selective one of said n storage disks; and
resuming said assigned data segments in said at most two storage disks in case of failure of said at most two storage disks.

19. The method according to claim 18, wherein said first and second computing rules execute a same exclusive-or (XOR) computing operation on said n−2 data segments.

20. The method according to claim 18, wherein each of said x first parity blocks is computed by selecting an exclusive data block out of each of said n−2 data segments according to said first computing rule, and each of said x+1 second parity blocks is computed by selecting an exclusive data block out of selective n+3 data segments from said n+2 data segments according to said second computing rule.

* * * * *